US012058762B2

United States Patent
Neelakantamurthy et al.

(10) Patent No.: US 12,058,762 B2
(45) Date of Patent: Aug. 6, 2024

(54) 5G N3 DATA PLANE ENRICHMENT USING N11 INTERFACE IN A MONITORING SYSTEM

(71) Applicant: NetScout Systems, Inc., Westford, MA (US)

(72) Inventors: Yashovan B. Neelakantamurthy, Los Gatos, CA (US); Sandeep Prasad, Pleasanton, CA (US); Abhishek Saraswati, Santa Clara, CA (US); Tauras Liubinskas, Lexington, KY (US); Domenico Aldrovandi, Sassuolo (IT); Shilpa Bansod, San Jose, CA (US); Vijayalakshmi Seshadri, San Jose, CA (US); Daniel Andrew Hill, Murphy, TX (US)

(73) Assignee: Netscout Systems, Inc., Westford, MA (US)

( * ) Notice: Subject to any disclaimer, the term of this patent is extended or adjusted under 35 U.S.C. 154(b) by 0 days.

(21) Appl. No.: 18/137,031

(22) Filed: Apr. 20, 2023

(65) Prior Publication Data

US 2023/0262828 A1 Aug. 17, 2023

Related U.S. Application Data

(63) Continuation of application No. 17/463,472, filed on Aug. 31, 2021, now Pat. No. 11,723,105.
(Continued)

(51) Int. Cl.
*H04W 76/22* (2018.01)
*H04W 4/029* (2018.01)
(Continued)

(52) U.S. Cl.
CPC ........... *H04W 76/22* (2018.02); *H04W 4/029* (2018.02); *H04W 8/08* (2013.01); *H04W 12/72* (2021.01);
(Continued)

(58) Field of Classification Search
CPC ....... H04W 76/22; H04W 4/029; H04W 8/08; H04W 12/72; H04W 76/10;
(Continued)

(56) References Cited

U.S. PATENT DOCUMENTS

| 8,644,762 B1 | 2/2014 | Liubinskas et al. |
| 10,243,732 B1 | 3/2019 | Herzerg et al. |

(Continued)

FOREIGN PATENT DOCUMENTS

WO WO 2021155939 A1 * 8/2021

OTHER PUBLICATIONS (WO 2019105483 A1) >>> Transmission Method and Relay Node (see title) (Year: 2019).*
(Continued)

*Primary Examiner* — Meless N Zewdu
(74) *Attorney, Agent, or Firm* — Foley & Lardner LLP

(57) ABSTRACT

In some embodiments, a non-transitory computer readable medium is disclosed. In some embodiments, the medium includes instructions for providing a mobile user monitoring solution that, when executed by a processor, cause the processor to capture a first message transmitted over an N11 interface, extract at least one type of session ID and a first Next Generation Application Protocol (NGAP) tunnel endpoint identifier (TEID) from the first message, store the at least one type of session ID and the first NGAP TEID in a first N11 protocol data unit (PDU) session record, capture a second message transmitted over an N3 interface, extract a general packet radio service (GPRS) tunneling protocol
(Continued)

(GTP)-user plane (U) TEID from the second message, wherein the GTP-U TEID matches the first NGAP TIED, and retrieve information associated with session details record using the GTP-U TEID.

16 Claims, 4 Drawing Sheets

Related U.S. Application Data

(60) Provisional application No. 63/223,806, filed on Jul. 20, 2021.

(51) Int. Cl.
*H04W 8/08* (2009.01)
*H04W 12/72* (2021.01)
*H04W 76/10* (2018.01)
*H04W 84/04* (2009.01)

(52) U.S. Cl.
CPC ......... *H04W 76/10* (2018.02); *H04W 84/042* (2013.01)

(58) Field of Classification Search
CPC . H04W 84/042; H04W 12/033; H04W 12/63; H04W 12/71; H04W 76/11; H04W 92/24; H04W 24/08; H04W 88/00; H04W 88/02; H04W 88/08; H04W 88/184; H04W 88/18; H04W 4/14; H04W 4/02; H04W 92/00; H04W 92/16; H04W 92/10; H04W 28/10; H04W 28/00; H04W 28/02; H04W 84/04; H04W 36/12; H04W 48/00; G06F 16/955; G06F 1/3231; G06F 1/3228; G06F 3/048; G06F 11/3438
See application file for complete search history.

(56) References Cited

U.S. PATENT DOCUMENTS

| | | | |
|---|---|---|---|
| 11,456,961 | B1 | 9/2022 | Mui et al. |
| 11,602,009 | B2 * | 3/2023 | Neelakantamurthy ..................... H04W 80/06 |
| 2002/0078150 | A1 | 6/2002 | Thompson et al. |
| 2005/0216595 | A1 | 9/2005 | Miyata et al. |
| 2011/0320608 | A1 | 12/2011 | Nelakonda et al. |
| 2013/0301611 | A1 | 11/2013 | Baghel et al. |
| 2014/0195899 | A1 | 7/2014 | Bastide et al. |
| 2016/0006625 | A1 * | 1/2016 | Javed et al. .......... H04L 43/026 |
| 2016/0028607 | A1 | 1/2016 | Weill et al. |
| 2017/0195486 | A1 | 7/2017 | Li et al. |
| 2018/0199398 | A1 * | 7/2018 | Dao et al. ............. H04W 76/30 |
| 2019/0191330 | A1 * | 6/2019 | Dao et al. ............. H04W 28/06 |
| 2019/0335392 | A1 * | 10/2019 | Qiao et al. ............. H04W 48/18 |
| 2019/0394833 | A1 * | 12/2019 | Talebi Fard et al. . H04W 80/10 |
| 2020/0280511 | A1 | 9/2020 | Gapin et al. |
| 2020/0374684 | A1 * | 11/2020 | Deng et al. ............. H04W 8/12 |
| 2021/0289402 | A1 * | 9/2021 | Ke et al. ........... H04W 36/0022 |
| 2022/0104308 | A1 | 3/2022 | Talebi Fard et al. |
| 2023/0007473 | A1 | 1/2023 | Muthuchamy et al. |
| 2023/0025738 | A1 | 1/2023 | Neelakantamurthy et al. |
| 2023/0029167 | A1 * | 1/2023 | Neelakantamurthy et al. ............. H04W 80/06 |
| 2023/0036645 | A1 | 2/2023 | Qiao et al. |
| 2023/0209653 | A1 * | 6/2023 | Neelakantamurthy et al. ............. H04W 80/06 |

OTHER PUBLICATIONS

CN 109429232 A) >>> Network Access and an Access Control Method and Device (see title) (Year: 2019).*
(CN 104883736 B) >>> The Terminal Locating Method and Device (see title) (Year: 2018).*
(CN 110447209 A) >>> System, Method and Device for User Plane Traffic Forwarding (see title) (Year: 2019).*
(CN 111010673 B) >>> A Communication Method and Device (see title) (Year: 2021).*
(KR 20160043048 A) Connection Management Method and Access Network Element (see title) (Year: 2016).*
(VN 10038653 B) >>> Data Transmission Method, First User Plane Functional Entity and Data Transmission System (see title) (Year: 2024).*
(WO 2019158040 A1) Method and Device for Switching (see title) (Year: 2019).*
(CN 111182657 A) >>> Method and Device for Establishing a Tunnel Negotiation (see title) (Year: 2020).*
Youn et al., (WO 2021066346 A1) >>> Method for Moving PDU Session on Non-3GPP to 3GPP Access (see title and abstract) (Year: 2021).*

* cited by examiner

5G N3 DATA PLANE ENRICHMENT USING N11 INTERFACE IN A MONITORING SYSTEM

CROSS-REFERENCE OF RELATED APPLICATION

This application claims the benefit of priority as a continuation to U.S. patent application Ser. No. 17/463,472, filed Aug. 31, 2021, which claims the benefit of priority to U.S. Provisional Patent Application No. 63/223,806, filed Jul. 20, 2021, the entirety of each of which is incorporated by reference herein.

BACKGROUND

The 5G Core aggregates data traffic from end devices. The 5G Core also authenticates subscribers and devices, applies personalized policies and manages the mobility of the devices before routing the traffic to operator services or the Internet. The 5G Core and its predecessor, the Evolved Core Packet (EPC), are different in that the 5G Core is decomposed into a number of Service-Based Architecture (SBA) elements and is designed from the ground-up for complete control and user plane separation. Rather than physical network elements, the 5G Core comprises software-based network functions.

SUMMARY

Aspects of the present disclosure relate generally to a 5G network, and more particularly to a system, apparatus, and method for monitoring an N3 interface.

In some embodiments, a non-transitory computer readable medium is disclosed. In some embodiments, the medium includes instructions for providing a mobile user monitoring solution that, when executed by a processor, cause the processor to capture a first message transmitted over an N11 interface, extract at least one type of session ID and a first Next Generation Application Protocol (NGAP) tunnel endpoint identifier (TEID) from the first message, wherein the first NGAP TEID is one of an uplink (UL) type or a downlink (DL) type, store the at least one type of session ID and the first NGAP TEID in a first N11 protocol data unit (PDU) session record, store the at least one type of session ID in a session details record, capture a second message transmitted over the N11 interface, extract the at least one type of session ID and a second NGAP TEID from the second message, wherein the second NGAP TEID is the other of the UL type or the DL type for a same PDU session, store the at least one type of session ID and the second NGAP TEID in a second N11 protocol data unit (PDU) session record, capture a third message transmitted over an N3 interface, extract a general packet radio service (GPRS) tunneling protocol (GTP)-user plane (U) TEID from the third message, wherein the GTP-U TEID matches one of the first NGAP TEID or the second NGAP TEID, and retrieve information associated with the session details record using the GTP-U TEID.

In some aspects, the medium includes instructions for providing a mobile user monitoring solution that, when executed by a processor, cause the processor to retrieve the session details record using the GTP-U TEID by retrieving the at least one type of session ID from the N11 PDU session record using the GTP-U TEID, and retrieving the session details record using the at least one type of session ID.

In some aspects, the session details record include two or more of network information, session information, user information, or a user location.

In some aspects, the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, or a mobile equipment identity (MEI), and the user location includes one or more of a tracking area code (TAC), a cell area, or a public land mobile network (PLMN).

In some aspects, the at least one type of session ID includes (a) a permanent ID and a PDU ID, (b) a session management (SM) context ref, or (c) an SM context status uniform resource identifier (URI).

In some aspects, the permanent ID is one or more of a subscriber permanent identifier (SUPI), an international mobile subscriber identity (IMSI), a network access identity (NAI), or a permanent equipment identifier (PEI).

In some aspects, the first message is one of a session management (SM) context create request message or an SM context create response message, and the second message is one of an SM context modify request message, an SM context modify response message, an SM context notify request message, an SM context notify response message, an SM context release request message, or an SM context release response message.

In some aspects, the medium further includes instructions for providing a mobile user monitoring solution that, when executed by a processor, further cause the processor to capture an N11-N1N2 message transfer request message or an update message that includes a first encapsulated NGAP information element (IE) transmitted over the N11 interface, extract the at least one type of session ID and a third NGAP TEID from the N11-N1N2 message transfer request message or the update message, wherein the third NGAP TEID is different than both the first NGAP TEID and the second NGAP TEID, update the N11 PDU session record with the third NGAP TEID extracted from the N11-N1N2 message transfer request message or the update message.

In some aspects, the medium further includes instructions for providing a mobile user monitoring solution that, when executed by a processor, further cause the processor to capture an SM context create request message after an associated user is attached to 4G, wherein the first message is an SM context create response message captured after the SM context create request message is captured, and wherein the second message is an SM context modify request message.

In some aspects, the first message is an SM context modify request message, and the second message is an SM context modify response message.

In some embodiments, an apparatus is disclosed. In some embodiments, the apparatus includes a processor and a memory. In some embodiments, the memory includes programmed instructions that, when executed by the processor, cause the apparatus to capture a first message transmitted over an N11 interface, extract at least one type of session ID and a first Next Generation Application Protocol (NGAP) tunnel endpoint identifier (TEID) from the first message, wherein the first NGAP TEID is one of an uplink (UL) type or a downlink (DL) type, store the at least one type of session ID and the first NGAP TEID in a first N11 protocol data unit (PDU) session record, store the at least one type of session ID in a session details record, capture a second message transmitted over the N11 interface, extract the at least one type of session ID and a second NGAP TEID from the second message, wherein the second NGAP TEID is the other of the UL type or the DL type for a same PDU session, store the at least one type of session ID and the second NGAP TEID in a second N11 protocol data unit (PDU) session record, capture a third message transmitted over an N3 interface, extract a general packet radio service (GPRS) tunneling protocol (GTP)-user plane (U) TEID from the third message, wherein the GTP-U TEID matches one of the first NGAP TIED or the second NGAP TEID, and retrieve information associated with the session details record using the GTP-U TEID.

In some aspects, the memory includes programmed instructions that, when executed by a processor, further cause the apparatus to retrieve the session details record using the GTP-U TEID by retrieving the at least one type of session ID from the N11 PDU session record using the GTP-U TEID, and retrieving the session details record using the at least one type of session ID.

In some aspects, the session details record include two or more of network information, session information, user information, or a user location.

In some aspects, the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, or a mobile equipment identity (MEI), and the user location includes one or more of a tracking area code (TAC), a cell area, or a public land mobile network (PLMN).

In some aspects, the at least one type of session ID includes (a) a permanent ID and a PDU ID, (b) a session management (SM) context ref, or (c) an SM context status uniform resource identifier (URI).

In some aspects, the permanent ID is one or more of a subscriber permanent identifier (SUPI), an international mobile subscriber identity (IMSI), a network access identity (NAI), or a permanent equipment identifier (PEI).

In some aspects, the first message is one of a session management (SM) context create request message or an SM context create response message, and the second message is one of an SM context modify request message, an SM context modify response message, an SM context notify request message, an SM context notify response message, an SM context release request message, or an SM context release response message.

In some embodiments, a method is disclosed. In some embodiments, the method includes capturing a first message transmitted over an N11 interface, extracting at least one type of session ID and a first Next Generation Application Protocol (NGAP) tunnel endpoint identifier (TEID) from the first message, wherein the first NGAP TEID is one of an uplink (UL) type or a downlink (DL) type, storing the at least one type of session ID and the first NGAP TEID in a first N11 protocol data unit (PDU) session record, storing the at least one type of session ID in a session details record, capturing a second message transmitted over the N11 interface, extracting the at least one type of session ID and a second NGAP TEID from the second message, wherein the second NGAP TEID is the other of the UL type or the DL type for a same PDU session, storing the at least one type of session ID and the second NGAP TEID in a second N11 protocol data unit (PDU) session record, capturing a third message transmitted over an N3 interface, extracting a general packet radio service (GPRS) tunneling protocol (GTP)-user plane (U) TEID from the third message, wherein the GTP-U TEID matches one of the first NGAP TIED or the second NGAP TEID, and retrieving information associated with the session details record using the GTP-U TEID.

In some aspects, the session details record include two or more of network information, session information, user information, or a user location.

In some aspects, the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, or a mobile equipment identity (MEI), and the user location includes one or more of a tracking area code (TAC), a cell area, or a public land mobile network (PLMN).

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
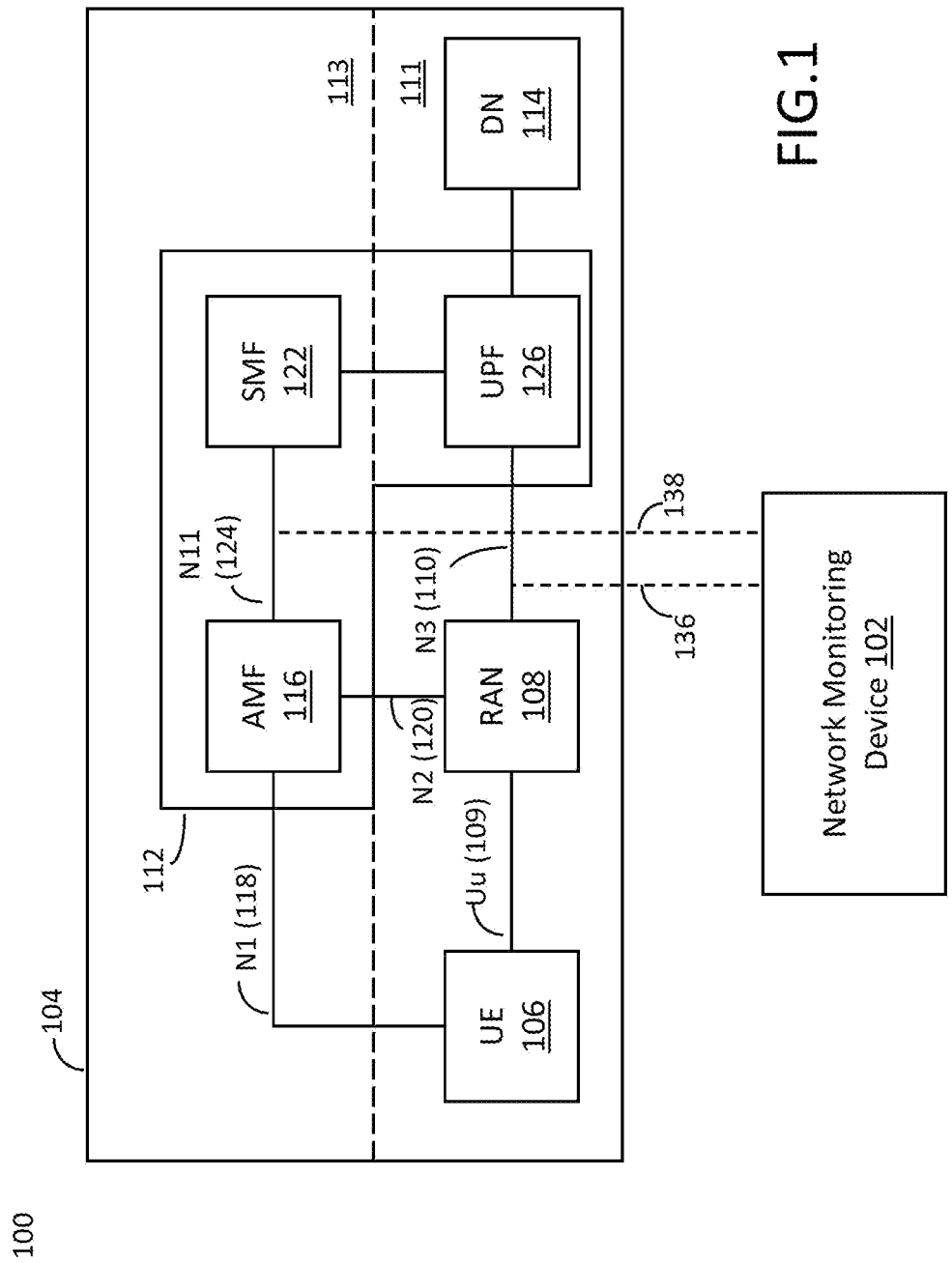
FIG. 1 is a block diagram of an environment for monitoring a 5G network, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In a 5G environment, an end user can attach to the network via N1/N2 to the access and mobility management function (AMF). The user can establish a user session using the session manage function (SMF). User data can be sent over general packet radio service (GPRS) tunneling protocol (GTP)-user plane (U) tunnels on the N3 interface. The GTP tunnels can be setup and torn down when the user is going from active to idle and during mobility. Control of the GTP tunnels can be managed over the N11 interface. To fully enrich the user data in 5G monitoring solution, monitoring the N11 interface to get and provide session details (e.g., user identity information, network information, session information, current location information, etc.) is essential.

There are a various challenges in monitoring subscriber sessions on the N11 and correlating and enriching the N3 data including tracking a subscriber session and a specific set of bearers on an N11 interface through a hypertext transfer protocol 2 (HTTP2) stream, managing and maintaining the bi-directional GTP tunnel information within the N11 session, and correlating the N3 GTP tunnel user data with the specific N11 session from the GTP tunnel information retrieved from N11.

Disclosed herein is a system, apparatus, and method that can address the technical challenges by bringing in multiple layers of processing and correlations from different components to provide a novel N11 monitoring solution which can enrich subscriber data from the correct GTP tunnels over the N3 interface. In addition to providing the enriched information to the subscriber data, the system can use the correlation and extraction of key data to filter in/out the subscriber traffic based on the monitoring system's requirements.

In some embodiments, N11 is sent over HTTP2 which processes the N11 header and data using fragmentation re-assembly, HTTP 2 header inflation, synthetic packet creation (creation of a single packet containing all fragmented pieces, on protocol data unit (PDU) boundaries and full HTTP 2 header intact), an HTTP stream identify and tracking function (which allows to track a request to a response). The HTTP stream identify and tracking function can identify a source IP address (IPv4 or IPv6), a destination IP address (IPv4 or IPv6), a source transmission control protocol (TCP) port, a destination TCP port, and a HTTP2 header stream identifier (ID).

In some embodiments, once the HTTP 2 processing is complete, N11 correlation for a specific user and PDU session is processed. For example, the system can extract a session from an session management (SM) create request and response transaction. The session ID (e.g., a session ID type) can be defined herein as one or more of ID a subscriber permanent identifier (SUPI), a PDU session ID, a session management (SM) context ref, an SM context uniform resource identifier (URI), or an SMF internet protocol (IP) address (e.g., IPv4 or IPv6). In some embodiments, the session ID from the create request correlates to a specific user and session and are used for N11 session tracking.

Once the N11 correlation for session creation is complete for a specific user, creation of GTP tunnels can proceed. For example, the system can extract a Next Generation Application Protocol (NGAP) tunneling endpoint identifier (TEID) from an NGAP transaction. In some embodiments, the GTP tunnels extracted are then used to correlate with the user data coming on the N3 interface.

In some embodiments, the system correlates and extracts information for the tunnels. The system uses N11 processing to pass key information for the processing of the N3 data when the establishing the GTP correlation table, which include subscriber identities, user location, service/quality, handset type, or filtering in/out based on cell tower internet protocol (IP) address, user identity, or data network name (DNN).

In some embodiments, the disclosure herein provides a comprehensive solution to enriching user data. In some embodiments, the disclosure provides a novel way to track the user, provide enriched user data and focus on specific users or other filtering criteria that may be required by the customer. In some embodiments, the disclosure herein effectively monitors the N3 interface in real-time.

Referring now to FIG. 1, a block diagram of an environment 100 for monitoring a 5G network is depicted, in accordance with some embodiments. The environment 100 includes a network monitoring device (e.g., a probe) 102 coupled to a 5G (New Radio) network 104. The network monitoring device 102 captures traffic (e.g., messages, packets) transmitted on various interfaces of the 5G network 104, deciphers traffic, extracts user data from the traffic, self-correlates user data, and correlates user data to subsequent traffic transmitted by a user (e.g., subscriber) over various interfaces.

The 5G network 104 includes user equipment (UE) 106 such as a mobile device, a phone, a smart phone, an Internet of Things (IoT) device, a vehicular communications device, a computer, a laptop, a tablet, a smart watch, or any 3GPP device associated with a user. The 5G network 104 is divided between a user plane (UP) 111 where the data communications between the UE 106 and the DNN 114 are processed, and a control plane (CP) 113 where all the signaling communications take place. The 5G network 104 includes a radio access network (RAN) 108 that is in communication with the UE 106 via a Uu (air, wireless, etc.) interface 109. The RAN 108 covers a geographical area which is divided into cell areas, with each cell area being served by a base station (e.g., a cell tower, a next generation nodeB (gNB), etc.).

The 5G network 104 includes a core network (CN, e.g., a 5G core network) 112, which provides access to one or more data networks (DN) such as the DN 114 (e.g., the Internet, a Local Area Data Network, an Internet Protocol Multimedia Subsystem (IMS) network, etc.). Part of the CN 112 is in the UP 111 and the other part of the CN 112 is in the CP 113. The part of the CN 112 that is in the CP 113 includes a service-based architecture (SBA) in which messaging/signaling between network functions (NFs) are exposed via (e.g., happen on top of) hypertext transfer protocol (HTTP)/2 (e.g., HTTP or HTTP2) representational state transfer (REST)-ful application program interface (API).

Each of the components of the CN 112 can produce and/or consume NF services over the HTTP/2 transport. In some embodiments, container orchestrators (e.g., Docker Containers, Kubernetes) and microservices are employed in implementing the NFs.

The CN 112 includes, in the UP 111, a user plane function (UPF) 126 that forwards user traffic (e.g., user data, protocol data units (PDUs), user packets, messages) associated with the UE 106 between one or more access networks such as the RAN 108 and one or more data networks (DNs) such as the DN 114 (e.g., the Internet, a local area network, an internet protocol multimedia subsystem (IMS) network, etc.). For example, packets toward the UE 106 coming from the DN 114 are routed, based on a destination IP, to the UPF 126. In the example, the UPF 126 processes the packets and encapsulates them in a general radio service packet (GPRS) tunneling protocol (GTP)-user plane (U) tunnel, which will transport the user packets across the RAN 108 to reach the UE 106. The UPF 126 can also enforce quality of service (QoS) on uplink and downlink traffic of the UE 106 based on service data flow (SDF) templates. The UPF 126 is in communication with the RAN 108 via an N3 interface 110. The UPF is in communication with the DN 114 either directly or via another UPF.

Some embodiments include two uni-directional GTP-U tunnels connecting the RAN 108 and UPF 126. The access node (AN) tunnel on gNB includes the gNB's IP address and the UE's 106 tunnel endpoint identifier (TEID) (e.g., a TEID_an, a GTP-U TEID downlink (DL)), which is the GTP-U TEID at the gNB. This is the tunnel for UPF 126 to forward the UE's 106 downlink traffic to the UE 106 via the gNB. The core node (CN) tunnel on UPF 126 includes the UPF's 126 IP address and the UE's TEID (e.g., a TEID_cn, a GTP-U TEID uplink (UL)), which is the GTP-U TEID at the UPF 126. This is the tunnel for gNB to forward the UE's 106 uplink traffic to the DN 114 via UPF 126.

The user traffic transmitted over the N3 interface 110 can include one or more mobile IDs of the UE 106. In some embodiments, the one or more mobile IDs include one or more temporary IDs. In some embodiments, the one or more temporary IDs includes one or more of a temporary mobile subscriber identity (TMSI), a shorten(S)-TMSI, a 5G-S-TMSI, a globally unique temporary ID (GUTI), or a 5G-GUTI. In some embodiments, the one or more mobile IDs include one or more concealed identities such as a subscription concealed ID (SUCI). In some embodiments, the SUCI includes a concealed permanent ID (e.g., a subscriber permanent identifier (SUPI)), while in other embodiments such as in a null-scheme, the SUCI includes a non-concealed (revealed) permanent D.

The user traffic transmitted over the N3 interface 110 can include session details of a session. In some embodiments, the session details includes network information, session information, user/subscriber information, user location, and the like. In some embodiments, the network information includes a client internet protocol (IP) address, a service IP address, a service/data network name (DNN), etc. In some embodiments, the session information includes the DNN, a radio access technology (RAT) type, a quality of service (QoS), etc. In some embodiments, the user information includes a SUPI, a permanent equipment identifier (PEI), a general public subscription identifier (GPSI), subscriber IP addresses, a mobile subscriber international integrated services digital network (MSISDN) number, a mobile equipment identity (MEI), etc. In some embodiments, the user location includes a tracking area code (TAC), a cell area, a public land mobile network (PLMN), etc.

The CN 112 includes, in the CP 113, the access and mobility management function (AMF) 114, which manages access of the UE 106. The AMF 116 is responsible for coordinating authentication and registering users to the network. The AMF 116 also manages mobility of the UE 106 when the UE 106 roams from one gNB to another for session continuity. The AMF 116 is in communication with the UE 106 via an N1 interface 118. The AMF 116 is in communication with the RAN 108 via an N2 interface 120. FIG. 1 shows the interfaces as logical interfaces. In particular, the N1 interface 106 is part of the non-access stratum (NAS) which is a highest functional layer in a protocol stack between the CN 112 and the UE 106. In some embodiments, a message sent over the N1 interface are referred to as a NAS protocol data unit (PDU). Although most of the logical interfaces are same as their physical counterparts, messages transmitted over the N1 interface are physically transmitted via the RAN 108. In some embodiments, at least one of the UE 106, the RAN 108, or the AMF 116 encapsulates (e.g., appends, adds) the N1 messages with additional information elements (IEs).

The UE 106 registers and authenticates after the UE 106 transitions from an idle state. For example, the UE 106 sends a registration (e.g., initial NAS, initial UE, registration request, initial setup) message to the AMF 116. The registration message can include IEs including IEs needed to establish security in the initial message when the UE 106 has no NAS security context.

The registration message can include IEs for identifying the UE 106 or a user associated with the UE 106. The registration message can include one of one or more mobile IDs. Other messages transmitted over the N1 interface or the N2 interface (e.g., de-registration request, service request, identity response, etc.) may include one or more mobile IDs.

In some embodiments, the RAN 108 allocates a RAN UE a Next Generation Application Protocol (NGAP) ID to be used for (e.g., associated with) an NGAP session between the UE 106 and the AMF 116. In some embodiments, the RAN 108 encapsulates the registration message (e.g., the NAS PDU) with the RAN UE NGAP ID and forwards the encapsulated message to the AMF 116. In some embodiments, the AMF 116 allocates an AMF UE NGAP ID to be used for the NGAP session. In some embodiments, in the registration message or a subsequent N1 message (e.g., a downlink NAS transport) from the AMF 116 to the UE 106, the AMF 116 includes the AMF UE NGAP ID.

When the registration procedure of the UE 106 is successfully completed, the UE 106 can initiate a PDU session establishment request to the AMF 116 via the gNB over the N1 interface. In some embodiments, the objective of the UE's PDU session establishment is to establish a default QoS Flow (QFI) between the UE 106 and the Data Network (DN) 114 via the gNB. The UE 106 can then use the default QFI inside the established PDU session to exchange traffic with the DN 114.

The CN 112 includes, in the CP 113, the session management function (SMF) 122, which manages access of the UE 106. In some embodiments, the SMF 122 keeps track of PDU sessions and QFIs in the 5GS for UEs and make sure their states and status are in sync between NFs in the CP 113 and components in the UP 111. The SMF 122 communicates with the AMF 116 over an N11 interface 124. In some embodiments, the SMF 122 exchanges messages with the AMF 116 such as session management (SM) context create requests, SM context create responses, SM context update requests and SM context update responses. In some embodiments, the messages include permanent IDs such as the SUPI, an international mobile subscriber identity (IMSI), the PEI, an international mobile equipment identity (IMEI), an IMEI software version (IMEISV), a network access identity (NAI), etc. In some embodiments, the messages include other information elements (IEs) such as a DNN, an access network type (anType), a single network slice service assistance identifier (sNssai), etc.

The network monitoring device 102 is connected to the 5G network 104 using various links. For example, the network monitoring device 102 is coupled to the N3 interface 110 via link 136, the N11 interface 124 via link 138. In some embodiments, the network monitoring device 102 is coupled to other interfaces (e.g., the N1 interface 118, the N2 interface 120, Uu interface 109, etc.) via other links. Each of the links can be passive or active and include software, firmware, and/or hardware components, such as taps, probes, or port mirrors that can be positioned in-line along communication links between various components of the 5G network 104. In the case of a physical site, each link can receive a copy of packets flowing over the respective interface from a tap in-line with an edge router located at the physical site, or from a switch port analyzer ("SPAN") port on the edge router.

Figure 2A:
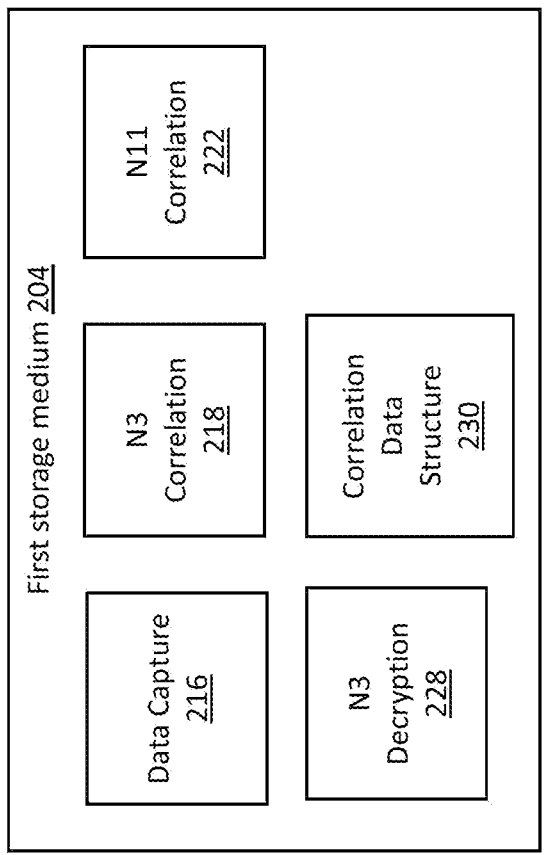
FIG. 2A is a block diagram of the network monitoring device, in accordance with some embodiments.
Figure 2A:
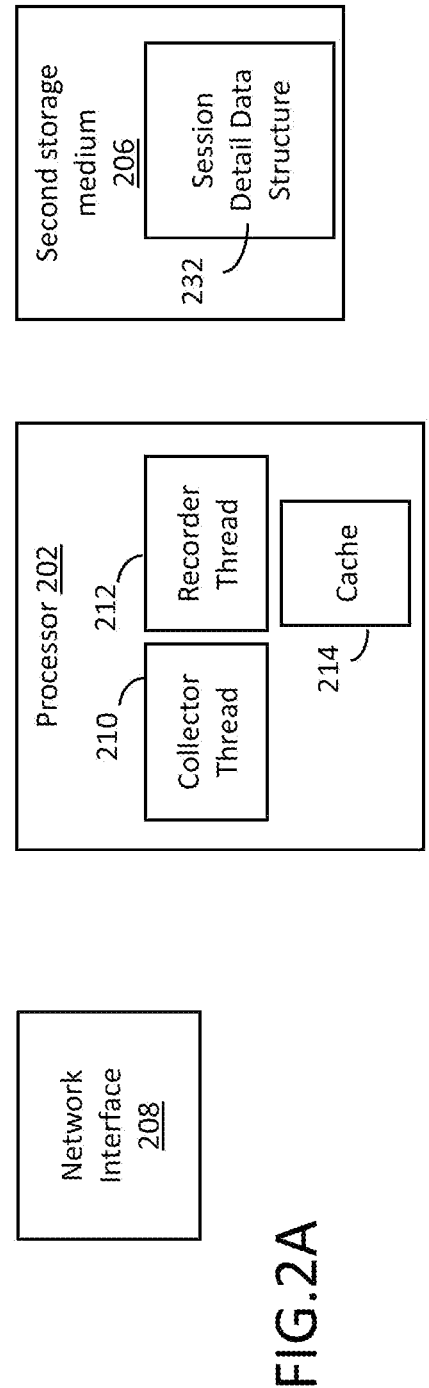

Referring now to FIG. 2A, a block diagram of the network monitoring device 102 is depicted, in accordance with some embodiments. The network monitoring device 102 includes a processor 202, a first storage medium 204, a second storage medium 206, and a network interface 208. The network monitoring device 102 may include other components such as input devices (e.g., keyboard, mouse) and output devices (e.g., display, monitor).

The processor 202 executes computer instructions stored in one or more of the first storage medium 204 or the second storage medium 206. Although only a single processor is shown in FIG. 2A, any number of processors is within the scope of the present disclosure. The processor 202 includes a cache 214. In some embodiments, user data extracted from captured traffic data can be stored in the cache 214.

The processor 202 includes one or more threads. For example, as shown in FIG. 2A, the processor includes a collector thread 210 and a recorder thread 212. In some embodiments, the collector thread 210 performs at least one of collecting user/session details/data/metadata (e.g., network information, session information, user information, user location, etc.) extracted from messages (e.g., N1, N2, or N3 messages) transmitted over various (e.g., N1, N2, or N3) interfaces, storing the session details in the cache 214 or the first storage medium 204, or aggregating statistics on the session details. In some embodiments, the recorder thread 212 stores, or copies, one or more of the messages or the session details to the second storage medium 206. Advantageously, by processing various messages in parallel in separate (e.g., dedicated) threads, the monitoring device 102 can achieve lower latency and live-time, or substantially live-time, monitoring of the 5G network 104. Although the processor 202 is shown as having one core and two threads, the processor 202 can have any number of cores and threads and remain within the scope of the present disclosure.

The first storage medium 204 stores instructions (e.g., computer instructions, programmed instructions) for one or more of processing, extracting, correlating, generating, storing, or retrieving traffic data (e.g., messages, packets, headers, payloads, fields, information elements, parameters, keys, etc.) or metadata derived from the traffic data. The first storage medium 204 is implemented in one of various devices (e.g., Random-Access Memory (RAM), static RAM (SRAM), dynamic RAM (DRAM), Resistive RAM (Re-RAM), magnetoresistive RAM (MRAM)) that has a faster read or write speed than the second storage medium 206.

In some embodiments, the first storage medium 204 includes instructions for data capture 216, N3 correlation 218, N11 correlation 222, and N3 decryption 228. In some embodiments, the data capture 216 instructions include instructions to capture messages (e.g., control packets or data packets). In some embodiments, the data capture 216 instructions include instructions to extract user correlation/monitoring-related data (e.g., mobile IDs, permanent IDs, PDU session IDs, NGAP IDs, container IDs, security context (e.g., one or more cipher keys, key set identifier, etc.), time stamps, any parameters or state information related to mapping/correlating users, NGAP sessions, PDU sessions, or session details) from the captured messages. For example, the data capture 216 instructions include instructions to capture messages transmitted over the N11 interface 124 and extract one or more of a permanent ID, a PDU session ID, NGAP tunneling endpoint identifier (TEID), or the session details associated with the user from the captured message transmitted over the N11 interface 124. In another example, the data capture 216 instructions include instructions to capture messages transmitted over the N3 interface 110 and extract one or more of a general radio service packet (GPRS) tunneling protocol (GTP)-user plane (U) TEID or the session details from messages transmitted over the N3 interface 110. In some embodiments, an NGAP TEID refers to the fact that the TEID is from an NGAP IE in an N11 message, whereas a GTP-U TEID refers to the fact that the TEID is in an N3 message, even though the NGAP TEID and the GTP-U TEID can be the same TEID (e.g., include the same content). The data capture 216 instructions can include instructions for software agents or virtual devices that remotely operate on, or control, each of the links (e.g., links 136 and/or 138) and/or any associated hardware.

In some embodiments, the N3 correlation 218 instructions include instructions to correlate/map/link any user data extracted from messages captured over the N3 interface 110. For example, the N3 correlation 218 instructions include instructions to correlate a permanent ID to session details. In some embodiments, correlating includes storing a first parameter in a first field of a record associated with a user (e.g., a session details record) and storing a second parameter in a second field of the record associated with the user. This may be referred to as generating a mapping from the first parameter to the second parameter. For example, the N3 correlation 218 instructions include instructions to store (e.g., populate) a SUPI extracted from an N11 message in a first field of a session details record and to store session details extracted from an N3 message in a second field of a session details record. In some embodiments, each mapping may be a key-value pair in which the first parameter (e.g., the SUPI) is a key and the second parameter (e.g., the session details) is the value. In some embodiments, the first parameter is an input to a hash function which generates or fetches (e.g., retrieves, accesses) the second parameter or a location/address of the second parameter.

In some embodiments, the N11 correlation 222 instructions include instructions to correlate a TEID (e.g., an NGAP TEID) extracted from a message captured over the N11 interface 124 to permanent ID (e.g., a SUPI), a mobile ID, or a PDU session ID extracted from the message or another message captured over the N11 interface 124. In some embodiments, the N11 correlation 222 instructions include instructions to store a NGAP TEID in a first field of an N11 PDU session record and store a permanent ID or other ID in a second field of the N11 PDU session record. In some embodiments, the N11 correlation 222 instructions include instructions to correlate (a) an NGAP TEID UL to the permanent ID or other ID and (b) an NGAP TEID DL to the permanent ID or other ID. In some embodiments, separate session records maintain the uplink TEID-permanent ID mapping and the downlink TEID-permanent ID mapping.

In some embodiments, the N3 decryption 228 instructions include instructions to decipher a ciphered N3 message using a cipher key, which may be stored in the N11 PDU session record, the session details record, or another record associated with the user. In some embodiments, the N3 decryption 228 instructions include instructions to determine whether traffic data is ciphered. For example, security state information may be extracted from a message or a separate message that may indicate whether the message is ciphered. The N3 decryption 228 instructions may include instructions to decipher a message if the extracted security state information indicates that the message is ciphered.

The first storage medium 204 includes the correlation data structure 230, which stores the mappings in one or more data structures (e.g., databases, tables, files). For example, a first table stores PDU session records (e.g., mapping of NGAP/GTP TEID-SUPI pairs). More or different mapping tables are within the scope of the present disclosure. Each table can include a number of records (e.g., rows). Each record may be associated with one UE (e.g., a first record is associated with the UE 106). In some embodiments, each record has a first field (e.g., entry) populated by the first parameter (e.g., an IE) of the mapping, or a hash thereof, and each of the one or more second fields populated by the second parameter/IE (e.g., one of the second parameters, if there is more than one) of the mapping, or a hash thereof. In some embodiments, the table is a hash table (e.g., a key-value table) in which the record containing the one or more second fields (e.g., the values, values in a bucket, etc.) is determined, fetched, or located based on transforming the first parameter by a hashing function (e.g., modulus of a predetermined number).

The second storage medium 206 stores data or metadata that is the result of processing or correlating the traffic data. The second storage medium 206 is implemented in one of various devices (e.g., solid-state drive, hard disk drive, optical drive, etc.) that can store a greater amount of data than the first storage medium 204. In some embodiments, the second storage medium 206 is distributed across multiple such devices. In some embodiments, the second storage medium 206 stores the instructions for the data capture 216, the N11 correlation 222, the N3 correlation 218, and the N3 decryption 228, or instances thereof. In some embodiments, the processor 202 can execute each of the instructions 216, 218, 222, and 228 from the second storage medium 206. In some embodiments, the second storage medium 206 stores copies of the correlation data structures 230. In some embodiments, the second storage medium 206 includes the session detail data structure 232. The session detail data structure 232 includes session details (e.g., network information, session information, user information, user location, etc.) extracted from the captured messages. In some embodiments, session details for each user is in a respective session details record. In some embodiments, a user's session details record persist even after the user has changed PDU sessions (e.g., PDU session IDs) or GTP tunnels (NGAP/GTP TEIDs). In some embodiments, the second storage medium 206 stores the captured messages, monitoring-related user parameters (e.g., the SUPI, the PDU session ID, the NGAP/GTP TEID, etc.) extracted from the captured messages, etc. In some embodiments, each session details record includes a permanent ID field populated with a SUPI of the UE 106 and a session details field populated with a session details populated with session details of the UE 106.

Figure 2B:
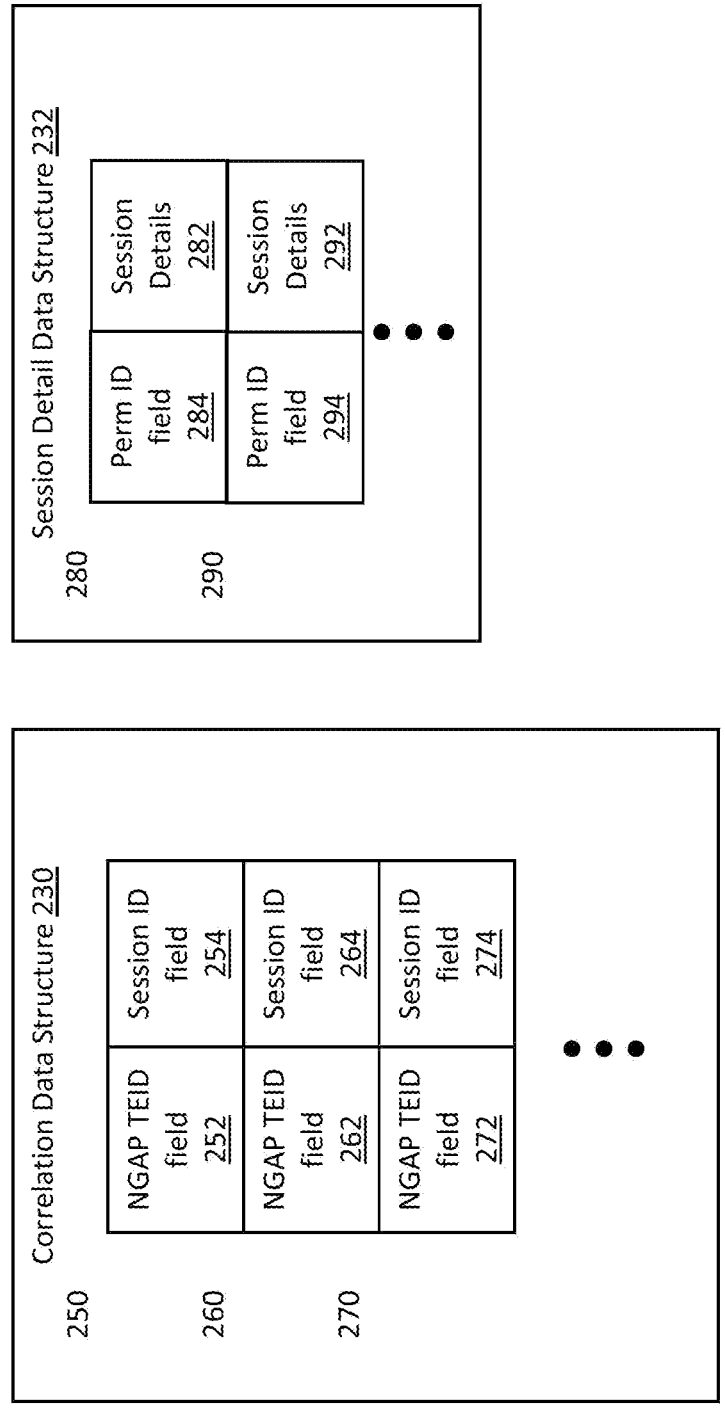
FIG. 2B is a block diagram of the correlation data structure and the session detail data structure, in accordance with some embodiments.

FIG. 2B illustrates records that are in a correlation data structure 230 and the session detail data structure 232, in accordance with some embodiments of the present disclosure. In some embodiments, the correlation data structure 230 is a data structure that includes N11 PDU session records. In some embodiments, each N11 PDU session record maps GTP TIEDs to SUPIs for different UEs such as the UE 106. For example, an N11 PDU session record 250 includes an NGAP TEID field 252 and a session ID field 254, an N11 PDU session record 260 includes an NGAP TEID field 262 and a session ID field 264, and an N11 PDU session record 270 includes an NGAP TEID field 272 and a session ID field 274. Each of the NGAP TEID fields may be populated by a different NGAP TEID. Each NGAP TEID is associated with a GTP tunnel. Some NGAP TEID fields may be populated by a NGAP TEID for an UL tunnel, while some other NGAP TEID fields may be populated by a NGAP TEID for a DL tunnel. For example, the NGAP TEID field 252 is populated by an NGAP TEID for an UL tunnel and the NGAP TEID field is populated by an NGAP TEID for a DL tunnel. In some embodiments, the UE 106 has at least one DL GTP tunnel and one UL GTP tunnel. In some embodiments, the UE 106 has more than one pair of DL/UL GTP tunnels. Although three records are shown, more or less than three records are within the scope of the disclosure.

In some embodiments, the session detail data structure 232 includes one or more session detail records such as session details record 280. In some embodiments, the session details record 280 includes the permanent ID field 284 and a session details field 282. In some embodiments, the session details record 290 includes the permanent ID field 294 and a session details field 292. Each of the permanent ID fields may be populated by one of a SUPI, a PEI, an IMEI, etc. Although two records are shown, more or less than two records are within the scope of the disclosure. In some embodiments, the session details field 282 includes multiple fields (e.g., at least one for network information, at least one for session information, at least one for user information, at least one for user location, etc.).

Returning to FIG. 2A, the network interface 208 may include a NIC (network interface card) or other standard network interfaces to receive captured network traffic, and to communicate with other network interface devices. For example, the network interfaces 208 may include an N3 interface 110 (e.g., the link 136), an N11 interface 124 (e.g., the link 138), an 802.11 interface, an Ethernet interface, or other wired or wireless network interfaces.

Figure 3:
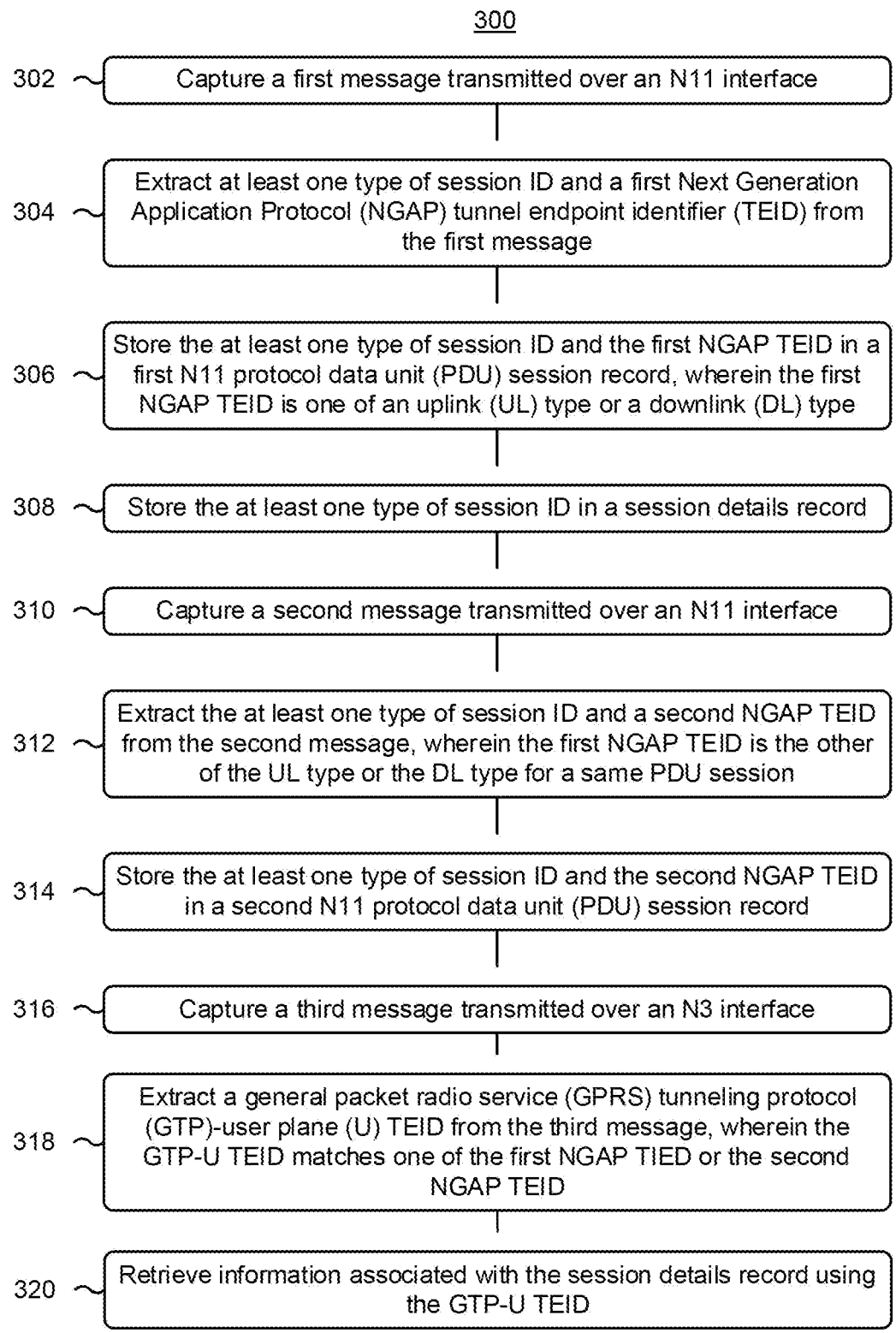
FIG. 3 is a flow chart of an example method for associating a user with a general packet radio service (GPRS) tunneling protocol (GTP)-user plane (U) tunnel, in accordance with some embodiments.

Referring now to FIG. 3, a flow chart of an example method 300 for associating a user with a GTP-U tunnel, in accordance with some embodiments. The method 300 can be performed by one or more systems, components, or modules depicted in FIG. 1, 2A, or 2B, including, for example, the network monitoring device 102, the processor 202, etc. In some embodiments, instructions for performing the method 300 are stored in the first storage medium 204. Additional, fewer, or different operations may be performed in the method 300 depending on the embodiment. Additionally, or alternatively, two or more of the blocks of the method 300 may be performed in parallel.

The processor 202 captures a first message transmitted over the N11 interface 124 (at operation 302). In some embodiments, the first message is one of a session management (SM) context create request message, or an SM context create response message. The processor 202 extracts, from the first message, at least one type of session ID and a first Next Generation Application Protocol (NGAP) tunnel endpoint identifier (TEID) from the first message (at operation 304). In some embodiments, the first NGAP TEID is one of an uplink (UL) type or a downlink (DL) type. In some embodiments, the at least one type of session ID includes (a) a permanent ID and a PDU ID, (b) a session management (SM) context ref, or (c) an SM context status uniform resource identifier (URI). In some embodiments, the permanent ID is one or more of a subscriber permanent identifier (SUPI), an international mobile subscriber identity (IMSI), a network access identity (NAI), or a permanent equipment identifier (PEI).

The processor 202 stores the at least one type of session ID and the first NGAP TEID in a first N11 protocol data unit (PDU) session record (at operation 306). For example, the processor 202 stores the first NGAP TEID in the NGAP TEID field 252 of the N11 PDU session record 250 and the at least one type of session ID in the session ID field 254 of the N11 PDU session record 250. In some embodiments, the processor 202 stores the at least one type of session ID in a session details record 280 (at operation 308). For example, in the case that the at least one type of session ID is a permanent ID, the processor 202 stores the at least one type of session ID in a permanent ID field of a session details record 280.

The processor 202 captures a second message transmitted over the N11 interface 124 (at operation 310). In some embodiments, the second message is one of an SM context modify request message, an SM context modify response message, an SM context notify request message, an SM context notify response message, an SM context release request message, or an SM context release response message. The processor 202 extracts, from the second message, the at least one type of session ID and a second NGAP TEID from the second message (at operation 312). In some embodiments, the first NGAP TEID is the other of the UL type or the DL type for a same PDU session. The processor 202 stores the at least one type of session ID and the second NGAP TEID in a second N11 protocol data unit (PDU) session record (at operation 314). In some embodiments, the processor 202 extracts, from the second message, another type of session ID and stores the other type of session ID in the second N11 protocol data unit (PDU) session record. In some embodiments, the processor 202 stores the other type of session ID in the session details record.

In some embodiments, the processor 202 creates and maintains N11 session management. In some embodiments, the first message is one of a session management (SM) context create request message or an SM context create response message, and wherein the second message is one of an SM context modify request message, an SM context modify response message, an SM context notify request message, an SM context notify response message, an SM context release request message, or an SM context release response message.

In some embodiments, the processor 202 change TEIDs with different messages which come from encoded NAS messages. In some embodiments, the processor 202 captures an N11-N1N2 message transfer request message or an update message that includes a first encapsulated NGAP information element (IE) transmitted over the N11 interface. In some embodiments, the processor 202 extracts the at least one type of session ID and a third NGAP TEID from the N11-N1N2 message transfer request message or the update message, wherein the third NGAP TEID is different than both the first NGAP TEID and the second NGAP TEID. In some embodiments, the processor update the N11 PDU session record with the third NGAP TEID extracted from the N11-N1N2 message transfer request message or the update message.

In some embodiments, the processor 202 tracks a user that attaches in 4G and moves to 5G. In some embodiments, the processor 202 captures an SM context create request message after an associated user is attached to 4G. In some embodiments, the first message is an SM context create response message captured after the SM context create request message is captured. In some embodiments, the second message is an SM context modify request message (e.g., after the first message).

In some embodiments, the processor 202 tracks a TEID handover. In some embodiments, the first message is an SM context modify request message and the second message is an SM context modify response message.

The processor 202 captures a third message transmitted over the N3 interface 110 (at operation 316). The processor 202 extracts a general packet radio service (GPRS) tunneling protocol (GTP)-user plane (U) TEID from the third message (at operation 318). In some embodiments, the GTP-U TEID matches one of the first NGAP TEID or the second NGAP TEID. The processor 202 retrieves information associated with the session details record using the GTP-U TEID (at operation 320). In some embodiments, the processor 202 retrieves the at least one session ID from the N11 PDU session record 250 using the GTP-U TEID. For example, the processor 202 scans/reads the NGAP TEID field of each N11 PDU session record in an N11 PDU session data structure (e.g., the correlation data structure 230) until the processor 202 finds a TEID (e.g., the first or second NGAP TEID) that matches the GTP-U TEID. Then, in the example, the processor 202 identifies the N11 PDU session record 250 having the TEID and retrieves, from the session ID field in the same N11 PDU session record, the at least one type of session ID or the other type of session ID. In some embodiments, the processor 202 retrieves session details from the session details record using the at least one type of session ID or the other type of session ID. In some embodiments, the processor retrieves, from the session ID field in the same N11 PDU session record, a type of session ID that is a permanent ID and uses it to retrieve the session details.

In some embodiments, the processor 202 stores or updates the session details in the session details record 280. In some embodiments, the session details record 280 (e.g., the session details therein) include one or more of network information, session information, user information, user location, etc. In some embodiments, the network information includes one or more of a client internet protocol (IP) address, a service IP address, a service/data network name (DNN), etc. In some embodiments, the session information includes one or more of the DNN, a radio access technology (RAT) type, a quality of service (QoS), etc. In some embodiments, the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, a mobile equipment identity (MEI), etc. In some embodiments, the user location includes one or more of a tracking area code (TAC), a cell area, a public land mobile network (PLMN), etc. In some embodiments, one or more of the session details that is stored in the session details record 280 is extracted in the first message, the second message, or another message transmitted over the N11 interface 124.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable medium comprising instructions for providing a mobile user monitoring solution that, when executed by a processor, cause the processor to:
   capture a first message transmitted over a first interface of a control plane of a network;
   store at least one type of session ID from the first message and a first tunnel identifier from the first message in a session record;
   capture a second message transmitted over a second interface of a user plane of the network;
   extract a user plane tunnel identifier from the second message, wherein the user plane tunnel identifier matches the first tunnel identifier;
   retrieve information associated with the session record using the user plane tunnel identifier; and
   extract the at least one type of session ID and the first tunnel identifier from the first message, wherein the first tunnel identifier is a first next generation application protocol (NGAP) tunnel endpoint identifier (TEID) and is one of an uplink type or a downlink type.

2. The medium of claim 1, comprising the instructions for providing the mobile user monitoring solution that, when executed by the processor, further cause the processor to:
   store the at least one type of session ID in a second session record, wherein the session record is an N11 protocol data unit (PDU) session record; and
   capture a third message transmitted over the N11 interface.

3. The medium of claim 1, comprising the instructions for providing the mobile user monitoring solution that, when executed by the processor, further cause the processor to:
   extract the at least one type of session ID and a second tunnel identifier from a third message, wherein the second tunnel identifier is a second next generation application protocol (NGAP) tunnel endpoint identifier (TEID) and is one of the uplink type or the downlink type; and store the at least one type of session ID and the second tunnel identifier in a second session record.

4. The medium of claim 1, wherein the user plane tunnel identifier is a general packet radio service (GPRS) tunneling protocol (GTP)-user plane (U) TEID, the medium further comprising the instructions for providing the mobile user monitoring solution that, when executed by the processor, further cause the processor to retrieve information associated with the session record using the GTP-U TEID by:

retrieving the at least one type of session ID from the session record using the GTP-U TEID; and retrieving the session record using the at least one type of session ID.

5. The medium of claim 1, wherein the session record includes two or more of network information, session information, user information, or a user location.

6. The medium of claim 5, wherein the network information includes one or more of a client internet protocol (IP) address, a service IP address, a service/data network name (DNN), the session information includes one or more of the DNN, a radio access technology (RAT) type, or a quality of service (QOS), the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, or a mobile equipment identity (MEI), and the user location includes one or more of a tracking area code (TAC), a cell area, or a public land mobile network (PLMN).

7. The medium of claim 1, wherein the at least one type of session ID includes (a) a permanent ID and a PDU ID, (b) a session management (SM) context reference, or (c) an SM context status uniform resource identifier (URI).

8. The medium of claim 7, wherein the permanent ID is one or more of a subscriber permanent identifier (SUPI), an international mobile subscriber identity (IMSI), a network access identity (NAI), or a permanent equipment identifier (PEI).

9. The medium of claim 1, wherein the first message is one of a session management (SM) context create request message or an SM context create response message, and wherein a third message is one of an SM context modify request message, an SM context modify response message, an SM context notify request message, an SM context notify response message, an SM context release request message, or an SM context release response message.

10. The medium of claim 1, further comprises the instructions for providing a mobile user monitoring solution that, when executed by a processor, further cause the processor to:

capture an N11-N1N2 message transfer request message or an update message that includes a first encapsulated next generation application protocol (NGAP) information element (IE) transmitted over an N11 interface;

extract the at least one type of session ID and a third tunnel identifier from the N11-N1N2 message transfer request message or the update message, wherein a third NGAP TIED is different than both the first tunnel identifier and a second tunnel identifier;

update the N11 PDU session record with the third tunnel identifier extracted from the N11-N1N2 message transfer request message or the update message.

11. The medium of claim 1, further comprising the instructions for providing a mobile user monitoring solution that, when executed by a processor, further cause the processor to capture an SM context create request message after an associated user is attached to 4G, wherein the first message is an SM context create response message captured after the SM context create request message is captured, and wherein the second message is an SM context modify request message.

12. The medium of claim 1, wherein the first message is an SM context modify request message, and wherein the second message is an SM context modify response message.

13. A system comprising a processor and a memory, wherein the memory includes programmed instructions that, when executed by the processor, cause the processor to:

capture a first message transmitted over a first interface of a control plane of a network;

store at least one type of session ID from the first message and a first tunnel identifier in a session record;

capture a second message transmitted over a second interface of a user plane of the network;

extract a user plane tunnel identifier from the second message, wherein the user plane tunnel identifier matches the first tunnel identifier;

retrieve information associated with the session record using the user plane tunnel identifier; and extract the at least one type of session ID and the first tunnel identifier from the first message, wherein the first tunnel identifier is a first next generation application protocol (NGAP) tunnel endpoint identifier (TEID) and is one of an uplink type or a downlink type.

14. The system of claim 13, wherein the memory includes the programmed instructions that, when executed by a processor, further cause the processor to:

store the at least one type of session ID in a second session record, wherein the session record is an N11 protocol data unit (PDU) session record; and capture a third message transmitted over an N11 interface.

15. A method comprising:

capturing a first message transmitted over a first interface of a control plane of a network;

storing at least one type of session ID from the first message and a first tunnel identifier in a session record;

capturing a second message transmitted over a second interface of a user plane of the network;

extracting a user plane tunnel identifier from the second message, wherein the user plane tunnel identifier matches the first tunnel identifier;

retrieving information associated with the session record using the user plane tunnel identifier; and extracting the at least one type of session ID and the first tunnel identifier from the first message, wherein the first tunnel identifier is a first next generation application protocol (NGAP) tunnel endpoint identifier (TEID) and is one of an uplink type or a downlink type.

16. The method of claim 15, further comprising:

storing the at least one type of session ID in a second session record, wherein the session record is an N11 protocol data unit (PDU) session record; and capturing a third message transmitted over an N11 interface.

* * * * *